United States Patent [19]

Forkner

[11] 3,989,853

[45] *Nov. 2, 1976

[54] METHOD FOR EXPANDING CONFECTIONS IN A PACKAGE

[76] Inventor: John H. Forkner, 2116 Mayfair Drive West, Fresno, Calif. 93703

[ * ] Notice: The portion of the term of this patent subsequent to Jan. 16, 1990, has been disclaimed.

[22] Filed: Nov. 18, 1974

[21] Appl. No.: 524,347

Related U.S. Application Data

[63] Continuation-in-part of Ser. No. 398,120, Sept. 17, 1973, abandoned.

[52] U.S. Cl. .............................. 426/305; 426/272; 426/412; 426/660; 53/22 B; 53/25
[51] Int. Cl.² .................. B65B 29/00; B65B 25/00; A23G 3/00
[58] Field of Search ................ 426/89, 93, 96, 103, 426/106, 113, 115, 118, 128, 241–243, 274, 275, 279, 280, 282–284, 285, 302, 305, 564, 568, 572, 392, 394, 395, 410, 411, 412, 413, 414; 264/46.3, 46.6; 53/25, 22 B; 425/405 R, 817 R, 812

[56] References Cited
UNITED STATES PATENTS

| | | | |
|---|---|---|---|
| 1,391,918 | 9/1971 | Thompson | 426/660 |
| 2,082,313 | 6/1937 | Todd | 426/445 |
| 2,898,634 | 8/1959 | Alderfer | 229/48 T |
| 2,899,318 | 8/1959 | Long | 426/568 X |
| 2,958,602 | 11/1960 | Gilmore | 426/274 X |
| 3,020,164 | 2/1962 | Forkner | 426/103 |
| 3,325,295 | 6/1967 | Vande Ven | 426/285 X |
| 3,366,485 | 1/1968 | Moen et al. | 426/564 X |
| 3,427,171 | 2/1969 | Jeppson | 426/241 |
| 3,432,087 | 3/1969 | Costello | 229/62.5 |
| 3,615,593 | 10/1971 | Patil | 426/564 X |
| 3,711,300 | 1/1973 | Forkner | 426/275 |
| 3,798,337 | 3/1974 | Abalo | 426/279 |

*Primary Examiner*—Steven L. Weinstein
*Attorney, Agent, or Firm*—Flehr, Hohbach, Test, Albritton & Herbert

[57] ABSTRACT

An improved method for the manufacture of expanded confections in sealed containers (e.g., cartons or polyethylene bags). The bag has a vent in one wall which is open during an expansion operation. Thereafter the vent may be sealed and the product distributed to the consumer. In one embodiment of the product one or more vent openings in one wall of the bag are sealed by a heat sealing operation, after the contents have been expanded. In another embodiment, a vent opening can be sealed by a tab or strip that can be adhesively applied to seal the same. In another embodiment the opening is closed by expansion of the contents.

11 Claims, 15 Drawing Figures

U.S. Patent  Nov. 2, 1976  Sheet 1 of 2  3,989,853
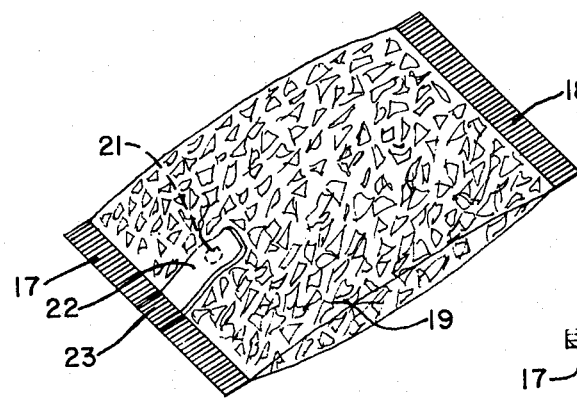
FIG.—1
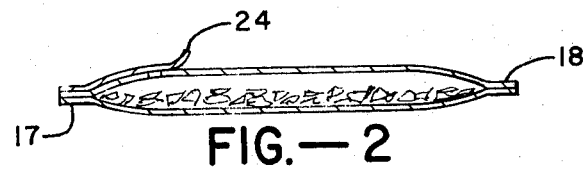
FIG.—2
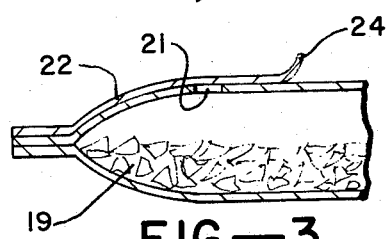
FIG.—3
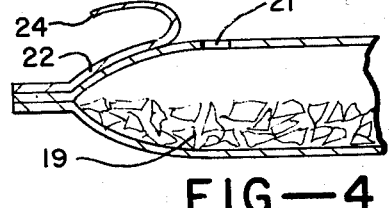
FIG.—4
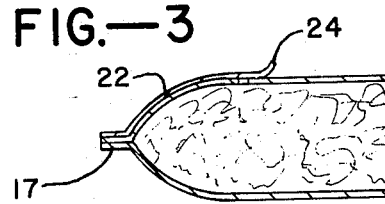
FIG.—5
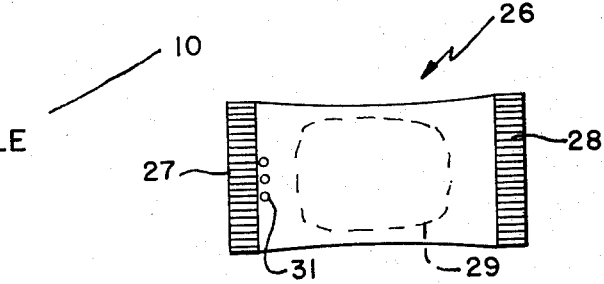
FACTORY PREPARATION OF BAGS WITH MEASURED AMOUNTS OF EXPANDABLE CONFECTION. VENT OPENING PROVIDED IN ONE WALL. — 10
MOISTURE MAY BE ADDED.
EXPANSION OF CONFECTION WHILE VENT IS OPEN BY HEATING TO SOFTEN THE CONFECTION AND SUBJECTING BAG AND CONTENTS TO A PARTIAL VACUUM — 11
VENT OPENING SEALED — 12
PRODUCT
FIG.—6
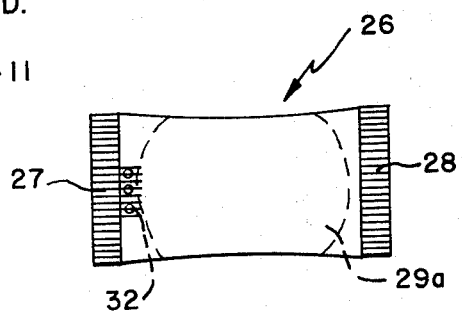
FIG.—7
FIG.—8

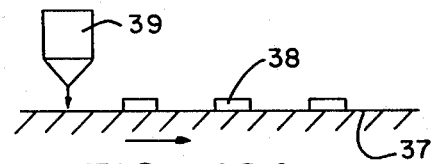
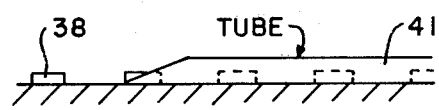
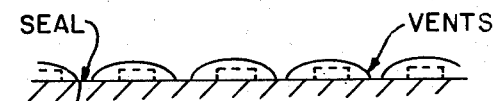
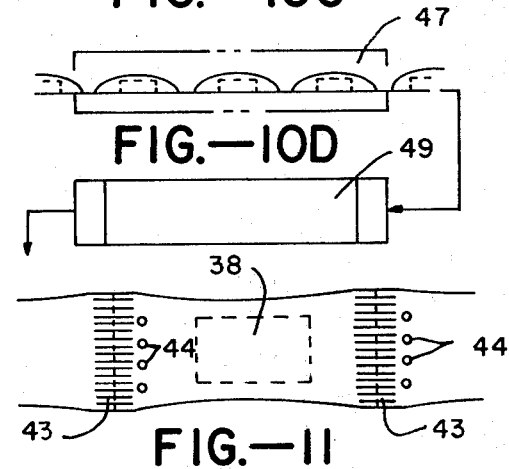
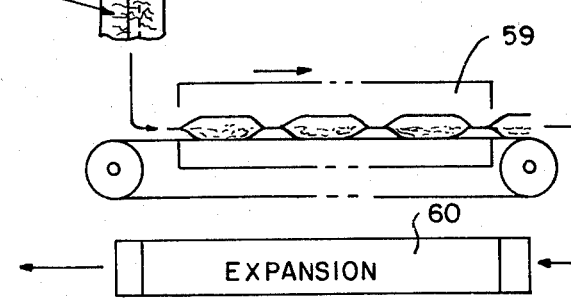

METHOD FOR EXPANDING CONFECTIONS IN A PACKAGE

CROSS-REFERENCE TO RELATED APPLICATIONS

This application is a continuation-in-part of my co-pending application Ser. No. 398,190 filed Sept. 17, 1973. entitled "EXPANDED FOOD PRODUCT AND METHOD OF MANUFACTURE" now abandoned in favor of continuation application Ser. No. 527,122, filed Nov. 25, 1974, now abandoned in favor of this application.

BACKGROUND OF THE INVENTION

This invention relates generally to packaged food products and methods for their manufacture. More particularly it relates to so-called expanded confection products.

The eating properties of many confections can be enhanced by expanding their volume, thus providing a friable cellular structure of low density. Various expanded products and methods for their manufacture are disclosed in my U.S. Pat. Nos. 3,711,300, 3,779,772, and 3,782,966. Certain problems are involved in the marketing of such products. Particularly they tend to be friable and are subject to crushing or breakage during handling and packaging. In addition, they are quite hygroscopic and when exposed to the atmosphere they readily deteriorate and lose their crips, friable, crunchy eating properties. My aforesaid application Ser. Nos. 398.190 of which this application is a continuation in part, discloses a method for the manufacture of expanded confections in sealed bags making use of continuous bag-making and filling operations.

SUMMARY OF THE INVENTION AND OBJECTS

It is an object of the invention to provide a method for the manufacture of confection products in expanded form which carries out expansion at the consumer level with delivery of expanded products to the consumer trade in closed or sealed moisture-proof containers or bags.

Another object is to provide a method in which bags or packages containing unexpanded confection are supplied to retail establishments, where the bags are processed for expanding the contents and then delivered to consumer customers in such condition as to maintain the contents fresh and friable.

Another object of the invention is to provide a package for carrying out the method, the package having provision for a vent to enable processing to expand the contents, and for closing the vent after processing.

Another object of the invention is to provide products produced by the method of my aforesaid copending applications Ser. No. 398,190 and Ser. No. 527,122.

Another object is to provide a method in which bags or containers containing pieces of unexpanded expandable confection are initially only partially filled and closed in a fashion suitable for distribution to a processing retailer, where the confection pieces are expanded within the containers and then delivered to the customer.

Another object is to provide a method which promotes formation of friable bonding areas between cellular expanded pieces of confection. In this connection the method employs an expandable material that is applied to the unexpanded pieces and which expands to a greater degree than the confection pieces. Such applied material forms friable bonds between the expanded pieces.

Another object is to promote expansion within the bags or containers whereby when the expandable mass includes confection pieces and expandable powder, expansion of the powdered material is maximized and optimum friable bonding is provided between the confection pieces. In practice some surface moisture is applied to the expandable material immediately before expansion when powdered material is present.

In general, the method of the invention comprises manufacturing a product including a package or bag containing an expandable confection and having one or more vent openings or perforations. Shortly before or at the time a retail establishment sells such products to the consumer trade, the confection is expanded within the bag while the vent is open, and then the vent may be closed when expansion is completed. In one embodiment the vent is closed or opened by use of a seal tab or strip that is secured to the bag and adapted to be adhesively applied over the vent. Also the invention includes products, including the final package after expansion of the confection, and the package before such expansion. In addition the invention includes special formulations and mixes of expandable material.

Further objects and features of the invention will appear from the following description in which the preferred embodiments have been set forth in detail in conjunction with the accompanying drawing.

BRIEF DESCRIPTION OF THE DRAWING

FIG. 1 is a perspective view illustrating a product comprising a bag made of moisture-proof material like polyethylene, having means for establishing a seal after the contents of the bag have been expanded.

FIG. 2 is a cross-sectional view of the bag shown in FIG. 1.

FIG. 3 is an enlarged detail in section illustrating a seal tab or strip for sealing the vent opening.

FIG. 4 is a view similar to FIG. 3, but showing the seal tab or strip pulled away to open the vent.

FIG. 5 shows the bag of FIG. 1 after the contents of the bag have been expanded.

FIG. 6 is a flow diagram outlining steps making use of a bag of the type disclosed in FIGS. 1–5.

FIG. 7 is a plan view illustrating a bag of the type disclosed in my aforesaid co-pending application Ser. No. 398,190, before expansion of the contents.

FIG. 8 shows the bag of FIG. 7 after the contents have been expanded, and after the vent openings have been sealed.

FIG. 9 is a flow diagram illustrating a procedure for carrying out the method by use of a continuous packaging machine, the packaging material moving horizontally through the various packaging operations.

FIGS. 10a, 10b, 10c and 10d are schematic views corresponding to certain steps of FIG. 9.

FIG. 11 is a plan view illustrating the packages before expansion.

FIG. 12 is a view schematically illustrating various operations when the machine used moves the web vertically through tube filling and sealing operations.

DETAILED DESCRIPTION OF THE PREFERRED EMBODIMENTS

The improvement of this invention may make use of high-speed packaging operations as disclosed in my said copending application Ser. No. 398,190, and Ser. No. 527,122 or the bags or other containers used may be filled manually. In any event, the method is carried out by introducing expandable material (e.g., a confection) into bags or other containers, particularly moisture-proof polethylene bags such as are commonly used in the food industry, to partially fill the same, after which the contents of the bag are expanded to provide the desired friable cellular structure which fills the container. In the improved method disclosed in this application, expansion is carried out at the retail level shortly before or as the product is being marketed to the consumer trade, and simple means is provided for sealing or closing the bag.

The general steps of the method are outlined in FIG. 6. In step 10 the bags are prepared at a suitable factory establishment, with measured amounts of expandable confection being placed in each bag. The volume of the initial dense mass is substantially less than the size of the bags, and is such that space for expanded volume is provided. One or more vent openings are provided in one or more walls of the bag. When it is desired to expand the contents of the bag, a small amount of moisture may be added to the bag, as for example by introducing the nozzle of a suitable atomizing device through one of the vent openings, and applying atomized moisture in an amount which may for example provide from ½ to 3% additional moisture to the expandable material. Such moisture addition is particularly desirable when the mass consists of pieces of confection together with expandable material in the form of powder or small sized discrete material. As will be presently explained in greater detail, the use of moisture in this fashion before the expanding operation serves to substantially increase the amount of expansion under specified conditions, and also serves to promote bonding between confection pieces along areas of cleavage. In step 11 the confection contained within the bags is expanded while the vent is open. Expansion is carried out by heating the bag an contents to soften the confection, and by subjecting the bag and contents to a partial vacuum. After or upon completion of expansion, the vent opening or openings can be closed or sealed, and the product is in condition for distribution to the consumer trade. During expansion excess moisture is removed.

To facilitate opening the bag vent preparatory to expanding the contents, and also to facilitate sealing the bags before they are distributed to the consumer trade, I prefer to use the means illustrated in FIGS. 1-4. The bag 16 in this instance is made of flexible packaging material of the film type, such as polyethylene. One or both ends of the bag are heat seals 17 and 18. The expandable material within the bag is indicated at 19. A vent opening 21 is shown in the upper wall of the bag, and is normally closed by seal tab or strip 22, which has pressure adhesive on its one side, whereby it can be adhesively secured to the adjacent wall of the bag to overlie and seal the vent opening. The end portion 23 of the tab has been incorporated in the heat seal 17, whereby the seal tab is permanently fixed to the bag. A portion 24 at the free end of the tab is not supplied with pressure adhesive, thus facilitating its manual engagement to strip it away from the vent opening.

Enlarged FIG. 3 shows the seal tab 22 adhesively engaged with the upper wall of the bag in such a fashion as to seal off the opening 21. FIG. 4 shows the tab 22 pulled back and away from the vent opening 21, thus facilitating removal of air and vapor during expansion of the contents. FIG. 5 illustrates the final product after the contents have been expanded, with the tab 22 returned to vent closing position to seal the bag. It will be seen that the expanded mass 19a is greatly increased in volume, compared to the unexpanded material illustrated in FIGS. 1-4.

FIG. 7 shows a bag 26 of the type disclosed in my said operating application Ser. No. 398,190. Here again the bag is made of flexible film material commonly used in the manufacture of bags, such as polyethylene, and the bag is provided with the end heat seals 27 and 28. The unexpanded mass 29 as shown within the bag consists of pieces of expandable confection. Perforations 31 are formed adjacent the heat seal 27, and are open during the expanding operation. After the expanding operation the perforations 31 are sealed as by providing a second heat sealing operation, which provides a heat sealing area 32 which extends about and serves affectively to seal the perforations.

Heating of the bags and contents can be carried out by various known methods. For example they may be introduced into a suitable hot air oven, they may be heated by radiant infra-red heat, by providing hot surfaces over which the bags are moved by microwave energy heating, or a combination of the foregoing. Also it is desirable but not necessary to supply some additional heat to the bags and contents while they are being subjected to a partial vacuum.

Assuming that the confection is in the form of pieces that are not bonded together, it is desirable to apply some vibration or jiggling to the bags while they are lying flat in a horizontal or slightly inclined position to promote uniform spreading. A slight tilting of the packages downwardly from the line of perforation, during jiggling, tends to shift the expandable material away form the perforations, thus avoiding blocking of the perforations during subsequent expansion.

The partial vacuum applied for expansion may be of the order of 28.5 – 29 inch mercury column, and can be applied by use of known types to vacuum chambers and pumps.

The amount of volumetric expansion can be determined by controlling various factors including the formulation of the expandable material (e.g., its content of expandable sugars like corn syrup), and temperature. In some instances it is desirable to provide sufficient expansion whereby the shaping of the final expanded material is to some extent determined by the volume and shaping of the bag or package. Preferably, expansion is terminated before any of the confection material finds its way into the vent openings. Additional factors controlling the amount of overall expansion include the moisture content of the confection, surface moisture present, the temperature of the confection during expansion, and the degree of partial vacuum applied. Also the presence of expandable material in moistened powdered form serves to accentuate overall expansion.

The expandable mass preferably consists of pieces of substantial size which are adhered together during heating and expansion. Such an expanded mass after cooling can be broken apart within the package by deforming the same, thus forming clusters or smaller units which in some instances may correspond to the original unexpanded pieces.

When additional material is supplied, such as a powder that expands to a greater degree than the pieces and provides friable bonds, the pieces in effect provide an edible base. Instead of using pieces of confection as base material, I may use an edible material that is not expandable, such as popped corn. Thus an expandable confection in the form of a hot concentrated syrup can be applied to pieces of popcorn, and the coating solidified by cooling whereby the material is free-flowing in bulk. Such a confection coated popped corn is the same as a commercial product known as caramel corn. When cooled and packaged as previously described, and the package heated and vacuum treated, the popped corn is not materially altered, except that its moisture content may be reduced. However, the coating confection is expanded to greatly increase the bulk volume. In the final package, weak bonds formed between the pieces of expanded material may be broken by flexing the package, thus forming either clusters or material that is free-flowing from the package.

Any one of the commercial types of popped corn can be used, including mushroom and butterfly types. The individual pieces of commercial popcorn are relatively large, as for example of the order of ¾ inch to one inch in diameter, with various protrusions. When popped corn is confection-coated and expanded as described above, the bulk volume is greatly increased (e.g., by 25 to 50 percent), and the configuration of the pieces is altered, being characterized by protrusions of random disposition and configuration. As previously indicated, most if not all of the expansion takes place in the coating itself, and not in the popped corn. Thus the volume of the coating may be increased by three or four times.

The amount of expansion of a confection coated popped corn product as described above can be controlled by taking into account the various factors referred to above. Some increase in the amount of expansion can be obtained by adding small amounts of moisture before coating, as previously described. For example, from 0.25 to 3% of moisture can be added by applying atomized water to the surfaces of the popped corn, immediately before the confection is applied. It is desirable that such added moisture be retained in a thin film or layer immediately underlying the coating of confection, and this this relationship is present at the time of heating and expansion. During expansion such moisture is evaporated to develop outward expansion forces, thus causing increased expansion and volume and creating a novel pebbled exterior.

As previously indicated, pieces of candy or confection also function as a base material when surfaced with granules or powder particles of discrete expandable material. During expansion, the surfacing material expands to form a modified surface for the pieces, while the base material may not expand, or may expand to a lesser degree. Thus pieces of peanut brittle can be surfaced with a confection powder like pulverized commercial malted milk balls. Surfacing can be carried out by applying surface moisture and intermixing the pieces and discrete or powdered material in a tumbler with the addition of a small amount of atomized water to secure good adhesion and to increase the moisture content on the surface layer of the pieces. Heating and application of a partial vacuum can serve to expand the surfacing material to a greater degree than the base peanut brittle material. The final product consists of an expanded peanut brittle body with a surface like a layer of expanded malted milk confection. Such a product has improved eating properties, its surface is not sticky in comparison with ordinary peanut brittle, and when such pieces become attached as a result of wetting, heating and expansion, they can be readily broken apart on cleavage areas formed by the expanded malted milk confection, without undue formation of fines. The operations just described can be carried out in a bag of the type shown in FIGS. 1–4. The bag is partially filled with confection pieces and the expandable powder. When it is desired to expand the contents, moisture is supplied by inserting a spray nozzle through opening 21, jiggling is applied to agitate the contents, and then the contents are expanded.

The above described technique (i.e., surfacing with expandable granular or powdered material) can also be applied to edible base materials, such as popped corn, that have been first coated with an expandable confection syrup as previously described. If the popped corn has been freshly coated with the confection syrup, the granular or powdered confection can be applied while the syrup remains sticky, thus making it unnecessary to use moisture to promote adhesion.

As previously indicated, many commercial confections, when plastic at an elevated temperature and subjected to a partial vacuum, expand to form a cellular mass. This assumes that the confection contains a certain amount of moisture (e.g., 2 - 5%) at the time of expansion. During expansion dehydration occurs and the moisture content is reduced to a relatively low value (e.g., 12 – 3%) whereby upon cooling, the material solidifies and the expanded cellular form is retained. Sugars which impart expandable properties to confections include commercial corn syrup containing dextrose, maltose and dextrins, refined corn sugar, dextrose, malt syrup, malt sugar, molasses and hydrolyzed cereal solids (e.g., "Morex" made by Corn Products Refining Co., with a dextrin equivalency of from 15 – 35). Also various mixtures of these materials can be used. Commercial confections that contain such sugars include peanut brittle, caramel, nougats, toffee and taffy, and most hard candies. Expansion may be promoted by including small amounts of sodium bicarbonate in the formulation, whereby expansion is aided by gas formation. Ingredients like milk solids can be added to modify the cellular structure.

To form pieces or particulates of an expandable confection, the ingredients are mixed and heated to an elevated temperature to form a homogeneous confection mass. The fused mass is then chilled to produce a solid and friable mass. Such chilling can be conveniently carried out by forming the material into sheets of a thickness of the order of 3/16 to ½ inch, and then cooling to a sufficiently low temperature to make the material brittle. By way of example, chilling may be to a temperature of the order of 80° F. or may be to a temperature well below ambient, such as 32° F. or lower. This brittle material is then broken up and subdivided to form a discrete particulate material. The size of the pieces or particulates may vary but, in a typical instance, may have a major dimension ranging from ¼ to ¾ inch. Where the material is desired in powder form, it may be ground to the particle size desired (e.g., minus 12 mesh). Such discrete material may include a minor amount of larger granules or particles. Subdividing can be carried out by the use of various types of hammer mills or so-called breaker rolls. Sizing may employ simple screening to provide pieces within the desired range. Undersized materials may be recycled to the steps preceding chilling. The distinctive properties of such pieces, such as flavor, are retained after expansion in the manners previously described. In other words, the expanded pieces in the overall mass are identifiable with the properties of the unexpanded pieces.

Instead of forming base pieces in the manner described above, the formulation while warm and plastic can be molded to forms (e.g., spheres, cubes, etc.) of the desired dimensions. Also pieces can be made by other known methods, such as by employing rotating dies, pelletizers and the like.

Assuming the term base material includes pieces of expandable confection or pieces of edible material that is not expandable (e.g., popped corn), the use of a substantial amount of powdered or small particle size discrete expandable material to make up the total mass has a number of advantages. Particularly, it serves to form friable bonds between the pieces on areas of cleavage, thereby enhancing eating properties and facilitating separation of the mass into smaller clusters or individual pieces, either in the package or after removal. Where the base material is not expandable, the discrete material after expansion provides a friable cellular coating that is more pleasant to eat than a simple unexpanded confection coating. When the base material is an expandable confection, the discrete material can be selected to expand a substantially greater amount than the pieces, thus again providing the pieces with a friable coating or overlay. In both instances the friable coating or overlay is not sticky, thus facilitating handling and eating either as a cluster of pieces bonded together by the expanded discrete material, or as individual pieces that have been broken apart. The expanded coating or overlay provides an attractive pebbled surface for the pieces.

The application of moisture as previously described promotes greater expansion of the discrete material and also promotes bonding on areas of cleavage. Adherence of the discrete material to the base pieces before packaging is desirable because it avoids settling out of fines after packaging. Also it provides a pebbled surfacing that enhances its appearance, and cleavage areas as previously described.

Previous reference has been made to sealing or closing the bags after expansion. Assuming that no extended lapse of time occurs between expansion and consumption, the carton, bag or other container in which the material is expanded need not be completely sealed or moisture proof. Thus inexpensive materials like waxed paper or cellophane can be used for the containers. Also the vent or vents provided may not be completely sealed or completely moisture proof after expansion. Assuming the use of a bag made of a suitable film, the vent can be a small hole or slit in the upper side wall (during expansion) and expansion can be carried out to such an extent that the expanded mass comes into intimate contact wih the wall in an area surrounding the hole or slit. With light adhesion between the wall and the expanded material, the latter forms a closure which is effective to protect the contents from absorption of any material amount of atmospheric moisture for short periods before the contents are consumed.

FIG. 9 shows the method being carried out continuously by use of a bag making machine which moves a web of wrapping material horizontally through tube-forming, filling and other operations. In Step 36 a measured amount of expandable material is deposited at spaced intervals along a moving web (e.g., a polyethylene film). Schematic FIG. 9A illustrates this operation. The web 37 is moving continuously over a horizontal support surface, and a depositing means 39 serves to deposit the wafers or slugs 38 of expandable confection material at regular spaced intervals.

In step 40 the web is continuously formed into an enclosing tube with a longitudinal seal formed between the overlapping longitudinal edges. As schematically illustrated in FIG. 10B, the continuously moving web 37 is shaped into the form of a tube 41 with overlapping longitudinal edges of the web being secured together by heat-sealing. It will be noted that the spaced wafers 38 are now within the tube 41.

In Step 42 closures or seals are formed between the sections of the tube and venting perforations are provided for each package section. In schematic FIG. 10C, the sealed areas are indicated at 43 and as shown particularly in FIG. 11 a plurality of venting perforations 44 are provided for each package or bag section. These perforations may be of the order of 1/32 to 3/16 inch in diameter and may be made by piercing means at the time heat seals are made. Preferably the line of perforations is relatively close (e.g., ⅛ inch) to the seal area at the filling end of the package.

In the next Step 46, the packages or pouches are subjected to preheating whereby the expandable material is heated and made sufficiently soft for expansion. FIG. 10D schematically illustrates heating being carried out in an oven 47 which surrounds the surface over which the packages are moving. Heating may be by hot air, radiant infrared heat, by providing hot surfaces over which the packages are moved, microwave energy heating, or combinations thereof.

In the next Step 48 the softened material is expanded by subjecting the packages to a partial vacuum. This is schematically illustrated in FIG. 10D. Device 49 is assumed to be a chamber that is evacuated and through which the packages are caused to pass or are held after heating. Inlet and outlet end portions of this device can be provided with known types of vacuum-locking devices. When a partial vacuum is applied to the packages, air within the package is evacuated through the venting perforations 44 whereby the confection material expands to a volume determined by various factors including the formulation of the expandable material (e.g., its content of corn syrup, soda, egg white, etc.), its initial moisture content, the degree of vacuum applied, and time and temperature. In some instances it is desirable to have sufficient expansion whereby the shaping of the final expanded material is to some extent determined by the volume and shaping of the package. Expansion should be terminated before any of the confection material finds its way into the venting perforations 44. In the final Step 50 the vent perforations 44 are sealed off as by a sealing operation and, if the packages have not been severed up to that time, the sealed area between package sections are cut. Sealing of the perforations 44 can be carried out simply by applying a heat-sealing operation over the area of the perforations. Also in some instances it may be sufficient to simply close them by application of a small piece of sealing material provided with pressure-sensitive adhesive.

When the perforations are closed by heat sealing across the area in which they are located, care should be taken to prevent any of the expanded material from being disposed in the fill end of the package where the perforations are located. Thus care should be taken to avoid an amount of material such that upon expansion some material is caused to be positioned in the fill end and thus interfere with pressing the perforated area of one wall against the other side wall of the package for an effective heat seal. In addition to control of the amount of material, one can control other factors which determine the extent of expansion, including formulation moisture content, temperature at the time the package is evacuated, and the amount of vacuum. Tilting the packages during heating and application of vacuum, whereby the perforated fill end is uppermost, also tends to avoid such undesirable positioning of expanded material.

FIG. 12 illustrates operations when using a packaging machine of the type in which the web of material moves downwardly through the various package-forming operations, and as disclosed in said application Ser. No. 527,122 filed Nov. 25, 1975. Thus, in this instance, the web 56 continuously moves downwardly to a tube-forming operation which serves to bend the web into the form of a tube 57 and to join the longitudinal edges as by heat-sealing. Simultaneously, with the formation of the tube, successive filling operations are employed to introduce measured quantities of expandable material into the upper open end of the tube. While it is possible to introduce slugs or wafers of the material, it is preferable to introduce the expandable material in the form of measured amounts of free-flowing particulate material. In conjunction with the filling operations, transverse seals 58 are formed along spaced intervals whereby the expandable material is enclosed within the successively formed individual packages. Simultaneously with forming the transverse seals, the venting perforations are formed as previously described. After the packages have been formed with each package provided with venting perforations, the remaining operations can be as previously described. Thus the packages or bags are schematically shown passing through the heating oven 59 and from thence to the vacuumizing apparatus 60. After expansion the venting perforations are sealed.

The procedure of FIG. 12 can be carried out by the use of various confections which are expandable. Examples of such confections are caramel, peanut brittle, nougats, toffee, taffy and the like, containing sugars such as corn sugar, molasses, or malt sugar or syrup, which impart expandable properties. Such confections may also include small amounts of sodium bicarbonate, whereby expansion is aided by gas formation.

While the use of bags is convenient and permits use of automated packaging, it is to be understood that other types of containers or cartons can be employed, provided venting is provided for the expansion operation.

Assuming use of bags as previously described, the vent can be made after the bag has been partially filled (i.e., slack filled) with the expandable material, but before the expanding operation. A small perforation or perforations or a small slit will suffice. After expansion the venting may be sealed, or may be left unsealed if the contents are to be consumed in a short time insufficient for any substantial absorption of atmospheric moisture.

In general the invention makes it possible to handle confections which when not confined are difficult to process by heating and expansion, due to their stickiness upon heating, as is exemplified by peanut brittle. Also the dry material is unexpanded during filling, thus facilitating filling by high speed filling machines such as are conducive to optimum volume of the finished packages. Breaking the expanded contents within the package after expansion reduces the amount of the fine pieces and confines any fine pieces to the package. Also, as is desirable with certain products, a controlled amount of restraint can be applied to the expanding material before the end of the vacuum treatment, thus promoting some molding to a desired shape, and applying some compacting forces to promote bonding between pieces of the mass that are being individually expanded. Such restraint may be applied by the package itself or by the use of package restraining means applied during expansion.

Examples of the invention are as follows:

EXAMPLE 1

The expandable confection was commercial peanut brittle, which contains sugar imparting expandable characteristics. The peanut brittle was broken into fragments ranging in size form about ¼ to ½ inch. Equal measured quantities of this free-flowing material were then introduced into polyethylene bags, and the open end of each bag heat-sealed, but with a row of perforations measuring about ⅛ inch in diameter through both side walls of the bag near one end located about ¼ inch inside the sealed area. Only about one-third of the volume of each bag was taken up by the confection. The bags, while supported in horizontal position, were vibrated for a short time to uniformly distribute the pieces over the horizontal bag area to create a thickness pattern of one or two pieces thick. These bags were then disposed horizontally in a hot air oven having an air temperature of about 200° F., whereby the contents of the bags were heated to a temperature of about 120° – 140° F. over a period of about 10 minutes, which served to soften the confection. The bags were then placed on shelves heated to a temperature of about 160° F., in a chamber where a partial vacuum was applied corresponding to about 18.5 inches mercury column. The individual fragments of the confection were expanded to about two times original volume, and at the same time bonds were formed between the expanded fragments to form an agglomerated or composite mass. There was some molding of the overall mass by the walls of the bag, although the expansion was not sufficient to completely fill the bag. After expansion and removal from the vacuum chamber the bags were permitted to cool whereby the expanded material became brittle. The bags were then passed through a pair of soft rubber rolls spaced to break the material to form clusters. Thereafter the bags were shaken to cause the material to settle away from the perforated end. The bag was then heat sealed over the area of the perforations.

One was able to visually observe that the expanded product was different in appearance than conventional peanut brittle, the main difference being the expanded state of the material. In addition, the bonding together of the separate fragments was noted. Each portion of the expanded mass was made up of a number of attached expanded fragments or granules. In part this was the result of bonding or attachments promoted by confinement in the bag, and the proximity of adjacent expanding pieces, resulting in a new confection product both with respect to form and appearance, but with the characteristic flavor of peanut brittle. The expanded mass could be readily broken into clusters by flexing the bag.

EXAMPLE 2

Instead of using a bag of the type shown in FIG. 7, I prefer to make use of bags of the type shown in FIGS. 1–4. Before the expansion operation, such bags are maintained sealed by having the tabs 22 adhesively secured over the vent opening 21. Immediately before processing to expand the confection, the tabs 22 are stripped back to expose the vents 21, and then expansion carried out as described in Example 1. After the expansion operation, and either before or immediately following cooling of the bags, the strips or tabs 22 are returned to the closed, sealed position as shown in FIG. 3. This provides a simple procedure which can be carried out in establishments which distribute the product in fresh, expanded form to the consumer trade.

EXAMPLE 3

The procedure described in Example 1 was repeated, but using commercial unexpanded malted milk balls measuring about ⅜ to ⅝ inch in diameter, in place of the fragments or granules of expandable confection. In the final product it was found that the bonds between the expanded balls were not as strong as with the expanded peanut brittle fragments, and that by simple flexing of the bag, the contents could be separated into individual expanded pieces. This procedure can be carried out by use of either the type of bag shown in FIG. 7, or that illustrated in FIGS. 1 – 4.

EXAMPLE 4

In this instance ordinary commercially available "caramel corn" was employed. This was popped corn which had had its outer surfaces coated with caramel-flavored confection, together with some free peanuts. Measured quantities of the caramel corn were introduced into bags in the same manner as in Example 1, with the open end of each bag being initially heat-sealed and provided with a line of venting perforations. After oven heating and expansion in a partial vacuum as in Example 1, it was found that expansion served to increase the total volume of the material by about 50 percent, and that the material was more tender and edible than the original caramel corn. Here again, weak bonds were formed between the popped corn pieces, which could be readily broken by flexing the packages to form either clusters or individual pieces. The foregoing procedure can likewise be used with either one of the two types of bags illustrated in the drawings, namely either that of FIG. 7, or that of FIGS. 1 – 4.

EXAMPLE 5

The same procedure was followed as in Example 1. However, before heating the packages in the oven, but while they were in horizontal position, they were first inclined in about 10°, with the line for perforations at the upper ends. The packages were then jiggled (vibrated) to effectively spread the material in a horizontal layer and away from the perforations. After heating, the bags were reversed (e.g., turned over) to expose the underside on top. This served to disperse some of the unexpandable additives (e.g., peanuts) so that they were not all at one side. It also served to place confection that had melted down a bit on the lower side, together with fines naturally tending to accumulate adjacent the lower heated side, on top, so that in the vacuum step they were less confined and expanded more, thus making a desirable appearance on both sides of the bag in the final expanded state. After removal from the vacuum, the venting perforations (as in FIG. 7) were sealed, and at the time no material was in the sealing zone, which if present would have interfered with obtaining an effective seal. This procedure likewise can be used with bags of the type shown in FIGS. 1 – 4.

The procedure of Example 5 was repeated, but before heating and jiggling, moisture was introduced into the package by inserting a spray nozzle through one of the perforations. This applied moisture to the surfaces of the pieces and served to promote desired bonding due to increased expansion on the moistened surface regions.

EXAMPLE 6

A base material was used consisting of a breakfast material manufactured by Quaker Oats Company of Chicago, Illinois under the name of "Quaker 100% Natural Cereal". This was a granola like cereal derived product. A quantity of this product was placed in a mixing tumbler and blended with 10% by weight of dry powdered corn sugar (Morex, manufactured by Corn Products Company). While the mass was being agitated, a small amount of atomized water was applied to the surfaces, serving to increase the moisture content of the mix by about 2%. The moisture was largely absorbed by hydration of the corn sugar, with some wetting of the surfaces of the granules, with the result that the surfaces of the granules were made sticky. Measured amounts of this material were placed in a polyethylene bag, after which the bags were heat sealed, except for vent perforations, heated and expanded, all as described in Example 1. After cooling, it was found that the granules of the cereal product were adhered together. However, flexing of the bags served to break up the expanded mass into the form of clusters. Upon microscopic examination it was observed that the powdered corn sugar had expanded several times its original volume (e.g., about six times), creating a bonding surface several times larger in area than that of the cereal product. The expanded material served to bond the particles of the cereal product together without materially changing their physical appearance.

To provide a contrast to the foregoing example, the above procedure was carried out with the substitution of granulated sugar in place of the powdered corn sugar. It was found that the particles of the final product were not bonded together, that no substantial expansion occurred, and that the cereal granules readily separated.

It was concluded from the foregoing that the expandable sugar performed an important function in that it provided expanded volume and aided in causing the granules of the cereal product to agglomerate together.

While in the foregoing Example 6 Morex powder provided good expansion and bonding, it has been found that certain confection blends are superior to Morex alone. For example, superior results have been obtained by use of a confection powder, produced by pulverizing commercial malted milk balls (before or after expansion). Malted milk balls have milk solids in their formulation, which promotes improved cell structure and desirable eating properties. The predetermined uniform cell structure obtained served to promote a final product having better crunch.

The procedures of this Example 6 can be carried out by use of bags of the type shown in FIG. 7, but preferably by use of the bags shown in FIGS. 1 – 4.

The above procedure was also carried out by omitting addition of moisture at the time of initial mixing of the base material with the expandable powder and introducing moisture through a perforation in the bag before jiggling, heating and expansion. This served to bond the finer material to the base pieces and caused added expansion in bulk volume.

EXAMPLE 7

An expandable confection was prepared using the following formula:

| | |
|---|---|
| corn syrup (e.g., glucose) 80 Brix | 100 lbs. |
| dry corn sugar | 100 lbs. |
| malt syrup (diamalt) | 30 lbs. |
| granulated sugar | 50 lbs. |
| hard fat (melting point 130° F.) | 20 lbs. |
| malted milk powder | 30 lbs. |
| salt | 1 lb. |

The dry ingredients of the formula, namely the dry corn sugar, granulated sugar, malted milk powder and salt, were blended together and then added, in a steam jacketed Sigma type mixer, to the corn syrup, while the latter was at boiling temperature. Thereafter the fat was added. The moisture content of this mix was about 6%, representing largely that imparted by the corn syrup. During mixing, additional heat was supplied by way of the steam jacket of the mixer to retain plasticity of the mass and to obtain a terminal temperature of about 240° F. The hot plastic mass was removed from the mixer and passed through rolls which served to form sheets about 3/16 inch thick. As the sheets cooled to about 80°F., they became brittle. Cooling was accelerated by blowing cold air at about 20° F. over the sheets. The sheets at about 70° F. were randomly broken and passed through paired breaking rolls to subdivide the material into granules. Sizing was carried out by sifting through a No. 12 screen and by removing fines passing through a No. 24 screen. Fines and oversize material were cycled in the process. The moisture content of the granules was about 5 to 6%. It was found that this mass was free-flowing and could be handled by conventional measuring and depositing equipment.

Some polyethylene bags having a capacity of about 72 cu. in. were prepared of tubular polyethylene stock with one end of the bag heat-sealed. About 6 oz. amounts of the granular material were then introduced into foil laminate trays, and the trays introduced into the bags. The open ends of the bags were closed by heat-sealing, with venting perforations being provided as in FIG. 7. These packages or bags were then placed in a hot air oven whereby the granular material was heated to a temperature of the order of about 140°F. The bags were then placed on heated shelves (140° F.) in a chamber where vacuum was applied corresponding to 28.5 inches mercury column. The granular material within the trays expanded to form a homogeneous solidified cellular mass, and the volume of the mass was sufficient to substantially fill the trays. Also, the expanded and solidified material was effectively molded by the trays. After expansion by the vacuum treatment, the venting perforations of the packages were heat-sealed. It was found that the products obtained in this fashion were attractive in appearance and could be readily eaten simply by removing the polyethylene film. The expanded mass evidenced individual expansion of the granules and was free of pockets or cavities such as are caused by excessive localized expansion, and also free of hardened unexpanded or partially expanded regions.

It was confirmed that the granular confection could be blended with other additives. For example, in one instance powdered malted milk and granulated malt sugar were mixed with the foregoing expandable granular confection. Such discrete additives had a substantially smaller particle size than that of the base granules. It was confirmed that such additives became a physical part of the final expanded product while the base material retained its identity and individual characteristics (e.g., appearance, texture and flavor). The discrete additives provided friable bonding between granules and areas of cleavage. It was found that this bonding could be weakened by adding such modifying agents as powdered sucrose to the discrete powdered additives.

It was also found that certain substances could be applied to the granular confection to weaken the bonding between the expanded granules. For example, small amounts of fat were found to have this effect. The fat in liquid form can be applied to the surfaces of the granules. In instances where it is desired to strengthen the attachment between expanded fragments, this can be done by dispersing small amounts of moisture on the surfaces of the granules while within the bag before heating and expansion, with or without addition of materials serving to modify the bonding between expanded granules, such as milk solids, powdered sucrose, malt, fat and the like.

I claim:

1. A method for the manufacture of a cellular expanded confection in bags comprising the steps of enclosing predetermined amounts of expandable confection pieces in bags, closing each bag at the end of the same by a seal extending across the bag, providing each bag with venting means in at least one wall of the same, and then expanding the confection in the bags by heating the bags and contents and subjecting the heated bags and contents to partial vacuum while the venting means is open.

2. A method as in claim 1 in which the ends of the bags are closed along laterally extending seal areas and the venting means consists of openings separate from the seal areas and in a wall of the bag faced upwardly during expansion.

3. A method as in claim 1 in which the venting means is closed after expansion of the confection.

4. A method as in claim 3 in which the venting means includes means which is positioned over the vent to close the same.

5. A method as in claim 1 in which moisture in atomized form is added to the confection in the bag before expansion of the same, the amount of moisture added being sufficient to substantially increase the amount of expansion.

6. A method as in claim 5 in which moisture is added through the venting means.

7. A method as in claim 1 in which the confection in the bags before expansion includes both expandable pieces and smaller sized discrete expandable material, and in which moisture is added to the bag and the contents agitated before expansion, the amount of moisture being sufficient to substantially increase the amount of expansion.

8. A method as in claim 7 in which the moistened discrete, confection is caused to expand to a greater extent than the pieces.

9. A method as in claim 1 in which the confection pieces comprise popped corn coated with an expandable confection.

10. A method as in claim 9 in which the pieces are prepared by dispersing moisture on the surfaces of popped corn and then coating the corn with expandable confection, the amount of moisture being sufficient to substantially increase the amount of expansion.

11. In a method for the manufacture of expanded food products, the steps of continuously forming flexible packaging material into a series of packages separated by transverse sealed areas, causing a measured amount of vacuum expandable confection containing material to be enclosed within each package before forming the transverse sealed areas, causing at least one wall of each package to be provided with vent openings separate from the sealed areas, and then subjecting the packages containing such expandable material to a partial vacuum while the material is at an elevated temperature and in softened condition, and maintaining the partial vacuum for a time sufficient to expand the material to the desired volume.

* * * * *